United States Patent [19]

Landler et al.

[11] 4,035,350

[45] July 12, 1977

[54] PROCESS FOR THE PREPARATION OF WATER-SOLUBLE AZO DYESTUFFS BY REACTING AN AROMATIC AMINE AND A COUPLING COMPONENT WITH ALKALI METAL NITRITE OR ALKYL NITRITE IN THE ABSENCE OF ACID

[75] Inventors: Josef Landler, Hofheim, Taunus; Erhard Wörfel, Hattersheim, am Main, both of Germany

[73] Assignee: Hoechst Aktiengesellschaft, Frankfurt am Main, Germany

[21] Appl. No.: 653,129

[22] Filed: Jan. 28, 1976

[30] Foreign Application Priority Data

Jan. 30, 1975 Germany .......................... 2503714

[51] Int. Cl.[2] .................. C09B 29/06; C09B 29/10; C09B 29/24; C09B 29/38

[52] U.S. Cl. ............................... 260/152; 260/144; 260/157; 260/158; 260/160; 260/162; 260/163; 260/164; 260/176; 260/178; 260/181; 260/182; 260/193; 260/194; 260/196; 260/197; 260/199; 260/200; 260/201; 260/202; 260/205; 260/206; 260/207; 260/207.1

[58] Field of Search ................ 8/27, 82, 83, 85, 89, 8/92, 93, 163; 260/144, 163, 196, 199, 200, 201, 153, 154, 146 D, 146 T, 147, 148, 149, 150, 151, 205, 206, 207, 207.1, 207.5, 176, 193, 162, 194, 197, 160, 202, 182, 157, 181, 164, 158, 178, 152

[56] References Cited

U.S. PATENT DOCUMENTS 3,793,305 2/1974 Balon ................................ 260/154

OTHER PUBLICATIONS

Bermes, Chemical Abstracts, vol. 77, No. 76664e (1972).

*Primary Examiner*—Floyd D. Higel

*Attorney, Agent, or Firm*—Curtis, Morris & Safford

[57] ABSTRACT

A new and very advantageous Process had been found for the preparation of azo dyestuffs by diazotation and coupling in which the synthesis is carried out without the hitherto usual addition of an acid, with the proviso that at least one of the diazo and coupling components contains at least one acid group. Besides the saving of reaction material and subsequently of alkali for neutralization of the reaction medium and isolation of the dyestuff, highly concentrated solutions of the dyestuff and salt-free or practically salt-free dyestuffs can be obtained, and waste-water is no longer charged with big amounts of salts.

4 Claims, No Drawings

PROCESS FOR THE PREPARATION OF WATER-SOLUBLE AZO DYESTUFFS BY REACTING AN AROMATIC AMINE AND A COUPLING COMPONENT WITH ALKALI METAL NITRITE OR ALKYL NITRITE IN THE ABSENCE OF ACID

The present invention relates to an improved process for the preparation of water-soluble azo dyestuffs.

Azo dyes having one or more water-solubilizing groups are generally prepared by diazotizing the corresponding diazotizable aromatic amine in an aqueous medium in the presence of a strong acid with a sodium nitrite solution or in sulfuric acid with nitrosyl-sulfuric acid, and coupling the solution or suspension of the diazonium compound thus obtained with the corresponding coupling component. The dyestuff may then be obtained from the resulting suspensions or solutions containing 5 to 10% of dyestuff, optionally by spray-drying or salting out, and subsequently isolating it, or by adding calcium oxide, hydroxide or carbonate and then concentrating the filtrate which is free from calcium sulfate. On an industrial scale, the drying operation is frequently followed by standardization with adjuvants and extenders to ensure a commercial-type concentration.

Moreover, according to known processes (cf. U.S. Pat. Specifications Nos. 2,478,767, 2,478,768, 2,418,416 and 3,793,305), the diazotization and coupling reaction are carried out at pH-values of from about 2 to 4 and/or, optionally, with the exclusion of water in pure acids in highly concentrated solutions or suspensions of the diazotizable aromatic starting amines and coupling components, but in the presence of an inorganic or organic acid. Those methods, however, still have the drawback of requiring an intermediate isolation of the dyestuff so as to separate the acid, used in an excess and considered necessary for the diazotization reaction or the diazo or coupling components used in an excess, or to neutralize the acid with an alkali, thus frequently producing considerable amounts of salts.

It has now been found that diazotization, especially one performed by means of salts of nitrous acid, can surprisingly be carried out without the addition of an organic or inorganic acid with simultaneous formation of the dyestuff by coupling in excellent yields if the diazotizable aromtic amine and the coupling component are mixed in a common batch with the equivalent amount of a nitrite, on of the starting components containing a water-solubilizing free acid group, for example the carboxy, sulfo, sulfato ($-OSO_3H$) or phosphato ($-OPO_3H_2$) group. These diazotization and coupling reactions, however, are also successful if the the starting amine and/or coupling compound contain more than one water-solubilizing group.

The present invention therefore provides an improved process for the preparation of water-soluble azo dyestuffs by diazotization of an aromatic amine with the stoichiometric amount of a coupling component in water and/or in an organic solvent which does not contain groups with an acid or basic effect, one of these amine and coupling components containing at least one free acid group, by reacting the aromatic amine and the coupling component with the nitrite without the addition of an acid and optionally adjusting, at the same time as or after the addition of the nitrite, a pH-value which is adequate for the coupling reaction by means of an acid-binding inorganic compound or buffer substance. Coupling components which contain an amino group can, generally, not be used for this purpose.

As diazotizing agents, salts of nitrous acid, preferably the alkali metal nitrites, such as sodium nitrite, and organic nitrites, especially nitrous acid esters of alkanols, for example amyl nitrite, may be used. When organic nitrites are used as diazotizing agents, the diazotization and coupling reactions may be carried out in water or an organic solvent which contains no groups with an acid or basic effect, or in mixtures of such solvents and/or with water. When an inorganic salt of the nitrous acid is used, water is preferred, but the diazotization and coupling reactions can also easily be carried out in organic solvents, optionally in admixture with water, which do not contain groups with an acid or basic effect and which are miscible with or soluble in water, as well as in organic, for example apolar, solvents which do not contain groups with an acid or basid effect, such as gasoline or benzene, in the presence of about at least 3% by weight, preferably at least 6% by weight of an organic solvent which does not contain groups with an acid or basic effect but which is miscible with or soluble in water.

Among the solvents mentioned above, those are especially preferred for the process of the invention which are miscible with or soluble in water and which, in aqueous solution, at 20° C, show a pH of from 6 to 8, preferably 6.5 to 7.5, as for example lower aliphatic alcohols, such as methanol, ethanol, n-butanol, lower aliphatic or cycloaliphatic ketones, such as diethylketone, acetone, butanone-(2), cyclohexanone, dimethylformamide, N-methyl-pyrrolidone, N-methylacetamide, dimethylacetamide, dimethyl-sulfoxide, dioxan, ethylene-glycol monomethyl ether and phosphoric acid tris-(N-dimethyl)-amide.

The diazotization and coupling reactions according to the invention may be carried out in dilute and concentrated aqueous, organic or aqueous-organic solutions, advantageously in a reaction medium in which the reaction components are present in a highly concentrated form, especially as a suspension or slurry in the solvent chosen, while part of the two reactants in the coupling process should be in a dissolved state.

Water is the preferred solvent.

The process of the invention is most preferably carried out by pasting up the diazotizable aromatic amine or the coupling component, or the two together, in a stoichiometrical amount, preferably in a finely divided form, in a small amount of water or in one of the other solvents to be used according to the invention, and then, if required, adding the other component in a stoichiometrical amount and subsequently the calculated equivalent amount of a salt of nitrous acid, preferably an alkali metal nitrite, for example sodium nitrite, in a solid, advantageously finely divided form. The nitrite may be added in one portion, advantageously, however, in several portions, since this permits a better temperature check.

The temperature during the diazotization and coupling reactions may vary from −10° to +50° C, preferably from 0° to 30° C.

When the reaction is carried out as disclosed above in a concentrated medium, the dyestuff obtained after coupling is in the form of a highly concentrated paste. If desired, extenders may be added to this dyestuff prior to or after separation of water or the solvent used.

It is surprising that the dyestuff is formed from stoichiometrical amounts and with very high yields or even quantitatively, without requiring an acid excess as hitherto consiedered necessary. It is sufficient for the reaction that at least one of the water-solubilizing acid groups contained in the reaction components is present in the form of the free acid.

If the acidity of the reaction components prevents a complete coupling reaction, it is necessary to add an inorganic compound giving an alkaline reaction or an acid-binding buffer substance to adjust the pH to a value or value range which is optimum for a quantitative reaction yield.

The process of the invention is suitable for the preparation of many anionic azo dyes which may also contain, as substituents, groups having fiber-reactive properties; these groups may be present both in the diazo and in the coupling components.

The process of the invention is furthermore suitable for the direct preparation of highly concentrated dyestuff solutions, for example for the preparation of stock solutions of these dyes, which are entirely free of salts, because dyestuffs can be prepared according to the process of the invention which are entirely or almost free of salts, if for example no or only slight amounts of buffer substances have to be added.

A variety of diazo and coupling components may be used for the process of the invention.

Diazo components are for example: Aniline, 4,4'-methylene-di-(m-toluidien), o-anisidien, o-phenetidine, 4-nitro-2-aminoanisole, 5-nitro-2-aminoanisole, 4-chloro-2-amino-anisole, p-phenetidine, p-anisidine, 4-amino-4-methoxydiphenyl-amine, 2-nitro-4-aminoanisole, 3-nitro-4-aminoanisole, 4-amino-diphenyl ether, 5-methyl-o-anisidine, 4-nitroaniline, 2-chloro-4-nitroaniline, 2,6-dichloro-4-nitroaniline, 2,6-dibromo-4-nitroaniline, 4-aminoacetanilide, 2-nitro-4-methylaniline, 4-(o-tolylazo)-2-methylaniline, 4-aminoazobenzene, 4-nitrophenyl-azo-1-naphthylamine, 2,4-dinitroaniline. 2,5-dimethoxyaniline, p-xylidine, 2,4-xylindine, p-butylaniline, p-amino-diphenylamine, p-aminoacetanilide, aminobenzyl alcohol, 4'-amino-methyl-3-nitrobenzophenone, 4-amino-4'-propoxybenzophenone, 2-amino-4'-fluorobenzophenone, 2-amino-4,5-dipropoxybenzophenone, 2-amino-5-bromobenzophenone, 4-amino-3-chlorobenzophenone, 2-amino-4,5-dichlorobenzophenone, 4-amino-2-methylbenzophenone, 3-amino-2,4-dimethylbenzophenone, 2-amino-4-acetylaminotoluene, benzidine, 3,3'-dichlorobenzidine, 2-nitro-benzidine, 2-amino-4-methoxybenzo-phenone, 2-cyano-4-nitro-aniline, 2,4-dinitro-6-chloroaniline, 2,5-diethoxyaniline, 4-cyanoaniline, 2-chloroaniline, 3-chloroaniline, 4-chloroaniline, 2,5-dichloroaniline, 4-chloro-2-nitroaniline, o-toluidine, p-toluidine, 5-chloro-2-aminotoluene, 6-chloro-2-amino-toluene, 4-chloro-2-aminotoluene, 4-chloro-2-(p-chlorophenylsulfonyl)-aniline, p-(p'-tolylsulfonyl)-aniline, p-(p'-ethoxy-phenylsulfonyl)-aniline, 2-ethoxy-1-naphthylamine, 1-naphthylamine-dianisidien, 4-carbomethoxyamino-2,5-diethoxyaniline, 4-benzoyl-amino-2,5-di-ethoxyaniline, 3-amino-4-methylbenzonitrile, 1-(m-amino-phenyl)-3-methyl-5-pyrazolone, 2-cyano-4-nitroaniline, 4,4'-diaminodiphenylsulfone, 4-methylsulfonylaniline, 2-(o-amino-phenyl)-2,1,3-benzotriazole, 4-aminobenzophenone, 3-chloro-4-cyanoaniline, o-aminobenzotrifluoride, 5-chloro-2-aminobenzotrifluoride, dehydrothio-p-toluidine, 4-amino-2,4-dichlorobenzophenone 4-amino-4'-ethylbenzophenone, 1-amino-anthraquinone-3-sulfonic acid, 2-amino-benzenesulfonic acid, 2,5-dichloro-6-sulfoaniline, 2,4-dichlore-5-carboxyaniline, p-amino-benzene sulfonic acid, 2-methyl-5- or -4-sulfoaniline, 2-methoxy-4-sulfoaniline, 2,5-dimethyl-4-sulfoaniline, 2,5-dimethoxy-4-sulfoaniline, 2-methyl-5-methoxy-4-sulfoaniline, 3-acetyl-amino-4-sulfoaniline, 4'-sulfobenzoylamino-2-sulfoaniline, 2-aminonaphthalene-6,8-disulfonic acid, 1-aminonaphthalene-4-sulfonic acid, 2-amino-naphthol (8)-4,6-disulfonic acid, 4-methoxy-5-sulfoaniline, 4-ethyl-5-sulfoaniline, 2-aminobenzthiazole, 2-amino-4-chlorobenzthiazole, 2-amino-sulfobenzthiazole, 2-amino-5-methyl-sulfobenzthiazole,4-chloroanthranilic acid, 2-aminobenzoic acid, 4-aminobenzoic acid, sulfanilic acid, 2,4-disulfoaniline, 2,5-disulfoaniline, 6-chlorometanilic acid, 2-amino-5-chlorobenzene sulfonic acid, 2-amino-5-nitrobenzene sulfonic acid, 3-chloroaniline-5-sulfonic acid, 3-amino-5-chloro-o-toluene sulfonic acid, 2-amino-6-chlorotoluene-3-sulfonic acid, 5-aminotoluene-4-sulfonic acid, 3-aminotoluene-6 -sulfonic acid, 4-acetylaminoaniline-2-sulfonic acid, 2-(p-aminoanilino)-5-nitrobenzene sulfonic acid, 5-amino-1-naphthalenesulfonic acid, 5-amino-2naphthalene sulfonic acid, 8-amino-1-naphthalene sulfonic acid, 5-acetamido-8-amino-2-naphthalene sulfonic acid, 8-acetamido-5-amino-2-naphthalene sulfonic acid, 6-amino-2-naphthalene-sulfonic acid, 7-amino-1,3-naphthalene disulfonic acid, 6-amino-1,3-naphthalene-disulfonic acid, 4,4'-diamino-2,2'-stilbene-disulfonic acid, 4,4'-diaminodiphenyl-2,2'-disulfonic acid, 3,3'-dimethyl-4,4'-diaminodiphenyl-6,6'-disulfonic acid, 2-ethoxy-1-naphthylamino-6-sulfonic acid, p-(p'-aminophenyl-azo)-benzene-sulfonic acid, p-(4-amino-3-methoxyphenylazo)-benzene-sulfonic acid, 4-(β-sulfatoethylsulfonyl)-aniline, 4-(β-sulfato-ethylsulfonyl-2-hydroxyaniline, 4-(β-phosphatoethylsulfonyl)-aniline, 3-(β-sulfatoethylsulfonyl)-aniline, 3-(β-chloroethylsulfonyl)-aniline, 3-(β-dimethylamino-ethylsulfonyl)-aniline, 2,5-disulfo-4-vinylsulfonylaniline, 4-methyl-5-(β-sulfatoethyl-sulfonyl)-aniline, 2,5-dimethoxy-4-(β-phosphatoethylsulfonyl)-aniline, 2-methyl-4-methoxy-5-(β-vinylsulfonyl)-aniline, 4-[N-methyl-N-(β-sulfatoethylsulfonyl)]-amino-aniline, 4-ethoxy-5-(β-sulfatoethylsulfonyl)-aniline, 2-chloro-4-(β-sulfatoethyl-sulfonyl)-aniline, 2-amino-8-(β-sulfatoethylsulfonyl)-naphthalene, 2-amino-6-(β-phosphatoethylsulfonyl)-naphthalene, 2- and 3-aminopyridine or 2-bromo-4-(β-sulfatoethylsulfonyl)-aniline.

Coupling components suitable for the process of the invention are, for example:

Naphthol compounds, such as 1-or 2-naphthol, 1-naphthol-4-sulfonic acid, 1-naphthol-2-sulfonic acid, 1-naphthol-3,6-disulfonic acid, 2-naphthol-5,7-disulfonic acid, 1-naphthol-3,6,8-trisulfonic acid, 1-acetylamino-naphthol(8)-3,6-disulfonic acid and -4,6-disulfonic acid, 1-benzoylamino-naphthol(8)-3,6-disulfonic acid and -4,6-disulfonic acid, 2-acetylamino-5-naphthol-7-sulfonic acid, 2-benzoylamino-8-naphthol-6-sulfonic acid, 2-tosylamino-5-naphthol-7-sulfonic acid, 2-acetylamino-8-naphthol-3,6-disulfonic acid, 2-acetylamino-5-naphthol-1,7-disulfonic acid, 2-benzoylamino-8naphthol-6-sulfonic acid, 2-phenylsulfonyl- amino-5-naphthol-7-sulfonic acid, 2-(N-methyl-N-acetyl)-amino-8-napthol-6-sulfonic acid, furthermore aromatic tertiary amines, especially aniline compounds, for example, N,N-dimethylaniline, diethyl-m-toluidine, di-N,N-(n-propyl)-o-toluidine, N- methyl-N-(2'-cyanoethyl)-aniline, N,N-bis-(2'-cyanoethyl)-aniline, N-methyl-N-(3'-cyanopropyl)-m-toluidiene, N-cyanomethyl-N-(2'-acetoxyethyl)-aniline, N,N-bis-(2'-acetoxy-ethyl)-aniline, N,N-bis-(3'-butyryloxypropyl)-m-toluidine, N,N-bis-(2'-benzoyloxyethyl)-m-toluidine, N-2'-cyanoethyl)-N-benzoylomethyl-aniline, N-ethyl-N-(2'-cyanoethyl)-aniline, N-ethyl-N-(2-cyanoethyl)-m-toluidine, N-(2'-cyanoethyl)-N-(2'-hydroxyethyl)-aniline, 2-(N-ethyl-anilino)-ethanol, phenyldiethanolamine, N,N-bis-(2-hydroxyethyl)-m-toluidine, m-chloro-N,N-dimethyl-aniline, N,N-bis-(2'-(2'-acet-oxyethyl)-N'-benzoyl-m-phenylene-diamine, 2-methoxy-5-benzoyl-amino-N,N-diethylaniline, N,N-bis-(2'-benzoylethyl)-N'-methyl-sulfonyl-m-phenylene-diamine, N,N-dimethyl-2-methoxy-5-methyl-aniline, N,N-bis-(2'-hydroxyethyl)-2-methoxy-5-chloroaniline, N,N-dimethyl-2,5-dimethoxy-aniline, N-methyl-N-(2',3'-di-hydroxypropyl)-2-chloro-5-methyl-aniline, N-methyldiphenyl amine, N,N-(2'-hydroxyethyl)-2-chloro-5-(p-nitro-benzamido)-aniline, N-(2'-cyanoethyl)-2,5-dimethoxyaniline, N-ethyl-N-(2'-cyanoethyl)-cresidine, N,N-bis(2'-cyanoethyl)-m-anisidne, N-(2'-cyanoethyl)-o-chloro-aniline, N-(2'-cyanoethyl)-N-(benzoyloxyethyl)-aniline and N-ethyl-N-(2'-cyanoethyl)-aniline;

Furthermore pyrazolone compounds, in which the keto group may be in 4- or 5-position, such as 3-methyl- or 3-carboxy- or 3-carbon-amido-pyrazolone, 3-carboxy- or 3-carboethoxy- or 3-carbomethoxy- or 3-methyl-1-(4'-sulfophenyl)-pyrazolone, 1-(4'-β-sulfatoethyl-sulfonyl)-phenyl-3-methyl- or 3-carboxypyrazolone-(5), 1-(2'-naphthyl)-3-methyl-pyrazolone-(5), 1-(2'-naphthyl)-3-methyl-pyrazolone-(5)5', 7'-disulfonic acid, 1-(2'-naphthyl-3-carboxyl-pyrazolone-(5)-5'-(β-phosphatoethyl)-sulfone, 1-(3'-β-sulfato-ethyl-sulfonyl-6-methoxy)-phenyl-3-carboxy-pyrazolone-(5), 1-(2',5'-dichloro-4'-sulfo)-phenyl- or 1-(2', 5'-dichloro-4'-β-sulfatoethylsulfonyl)-phenyl-3-methyl-pyrazolone-(5), 1-(2', 5'-dimethoxy-4'-β-sulfatoethyl-sulfonyl)-3-carbonamido-pyrazolone-(5), 1-(3'-carboxy)-phenyl- or 1-(3'-acetylamino-phenyl-3-carboxy-pyrazolone-(5) or 1-(4'-nitro)-phenyl-3-methyl-pyrazolone-(5);

furthermore other generally known coupling components carrying activated methylene groups, such as barbituric acid, derivatives of malonic acid, derivatives of acetoacetyl-arylides, for example acetoacetyl-5-sulfo-2-naphthyl-amide, acetoacetylanilide, aceto-acetyl-anilide-4-sulfonic acid, acetoacetyl-2,5-dimethoxy-anilide-4-sulfonic acid, acetoacetyl-2,5-dimethoxy-anilide-4-β-sulfato-ethylsulfone, acetoacetyl-4-chloro-anilide, acetoacetyl-2-chloro-anilide-4-sulfonic acid, moreover 8-hydroxy-quinoline, 2-hydroxy-quinoline, 2,5-bis-(N,N-diethylamino)-pyridine, hydroxy-carbazole, cresol, phenol, 2-methyl-indole, 5-chloro-2hydroxy-benzoic acid and 2,3-hydroxy-naphthoic acid or 2-hydroxycarbazole-3-carboxylic acid.

Thus, in general, a variety of aromatic amines may be used as diazo components in the process of the invention for the preparation of water-soluble azo dyes, and a variety of coupling components containing an enolic group or tertiary amino group.

Preferable components thereof correspond to the following general formulae:

As diazo components, the groups of the formulae

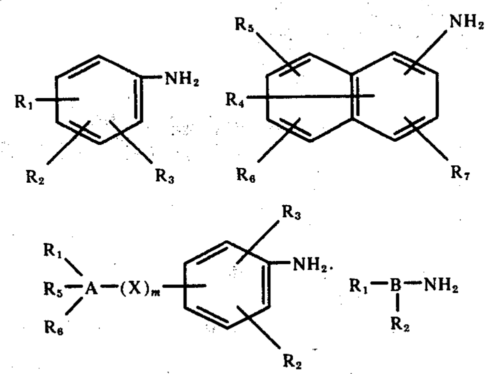

in which the formula members have the following meanings: $R_1$ stands for hydrogen, fluorine, chlorine, bromine, trifluoromethyl, alkyl of 1 to 4 carbon atoms, alkoxy of 1 to 4 carbon atoms, alkoxyalkylene having a total number of 2 to 6 carbon atoms, alkanoyl of 2 to 4 carbon atoms, alkanoylamino of 2 to 4 carbon atoms, benzoylamino, chlorobenzoylamino, nitrobenzoylamino, methylbenzoylamino, sulfobenzoylamino, chloroacetylamino, propionylamino, acryloylamino, carbalkoxy of 2 to 5 carbon atoms, carboxy, carbamoyl, sulfamoyl, N-alkyl- or N,N-dialkyl-sulfamoyl of 1 to 4 carbon atoms in each alkyl moiety, N-alkyl- or N,N-dialkylcarbamoyl of 1 to 4 carbon atoms in each alkyl moiety, hydroxy, sulfo, alkylsulfonyl of 1 to 3 carbon atoms, cyano, nitro or reactive group, especially a group of the formula.

$$-(CH_2)_n-(NR)_p-SO_2-Z$$

in which $R$ is hydrogen or alkyl of 1 to 4 carbon atoms, $n$ is zero or the integer 1 or 2, and $p$ is zero or the integer 1, and $Z$ is vinyl or a radical of the formula $$-CH_2-CH_2-Z_1$$

in which $Z_1$ is hydroxy or a radical capable of being split off by means of alkali, for example sulfato, phosphato, dimethyl-amino, diethylamino, methylsulfonyloxy, p-tolylsulfonyloxy, acetoxy, sulfobenzoyloxy, phenoxy, chlorine, bromine or a trimethyl-ammonium chloride group, $R_2$ stands for hydrogen, carboxy, sulfo, chlorine, bromine, alkyl of 1 to 4 carbon atoms, alkoxy of 1 to 4 carbon atoms, cyano, sulfamoyl, carbamoyl or a reactive group, especially a group of the formula $$-(CH_2)_n-(NR)_p-SO_2-Z$$

in which $R$, $n$, $p$ and $Z$ are defined as above, $R_3$ stands for hydrogen, sulfo, sulfamoyl, chlorine, alkyl of 1 to 4 carbon atoms or alkoxy of 1 to 4 carbon atoms, $R_4$ stands for hydrogen, chlorine, bromine, alkyl of 1 to 4 carbon atoms, alkoxyalkylene of 2 to 4 carbon atoms, alkanoyl of 2 to 4 carbon atoms, alkanoylamino of 2 to 4 carbon atoms, benzoylamino chlorobenzoylamino, nitrobenzoylamino, methylbenzoylamino, sulfobenzoylamino, chloroacetylamino, propionylamino, acryloylamino, carbalkoxy of 2 to 5 carbon atoms, carboxy, carbamoyl, sulfamoyl, N-alkyl- or N,N-dialkyl-carbamoyl or N-alkyl- or N,N-di-alkyl-sulfamoyl, each having 1 to 4 carbon atoms in each alkyl moiety, hydroxy, sulfo, alkylsulfonyl of 1 to 3 carbon atoms, cyano, nitro or a reactive group, especially of the formula $$-(CH_2)_n-(NR)_p-SO_2-Z$$

in which $R$, $n$, $p$ and $Z$ are defined as above, $R_5$ stands for hydrogen, chlorine, sulfo or a reactive group of the formula $$-(CH_2)_n-(NR)_p-SO_2-Z$$

in which $R$, $n$, $p$ and Z are defined as above, $R_6$ stands for hydrogen or sulfo, $R_7$ stands for hydrogen or sulfo, with the proviso that $R_6$ and $R_7$ are different, A stands for a benzene or naphthalene nucleus, X stands for a group of the formula —S—, —O—, —$SO_2$—, —NH—CO—, —CO—NH—, —NH—CO—NH—, —$CH_2$—, —$CH_2$—$CH_2$—, —$SO_2$—NH— or —NH—$SO_2$—, $m$ stands for zero or 1 and B stands for an aromatic heterocyclic ring which may contain one or two fused benzene rings, for example is a benzotriazole ring, a benzthiazole ring, a carbazole ring, a benzoxazole ring, a benzoxazolone ring, a benzimidazole ring, a benzimidazolone ring, a pyridine, triazole, imidazole or phthalimide ring.

Preferred coupling components are for example compounds of the formulae

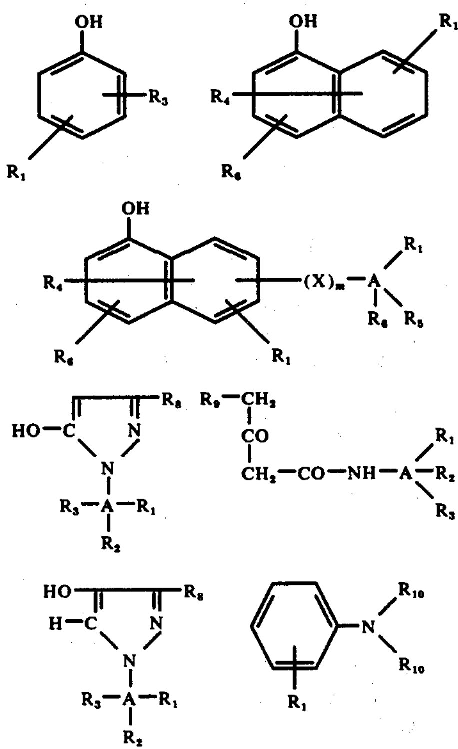

in which $R_1$, $R_2$, $R_3$, $R_4$, $R_5$, $R_6$, $A$, $X$ and $m$ are defined as above, and $R_8$ stands for methyl, carboxy, carbalkoxy of 2 to 5 carbon atoms, carbamoyl or phenyl, and $R_9$ for alkyl of 1 to 3 carbon atoms or phenyl optionally substituted by methyl, methoxy, chloro or sulfo, and the substituents $R_{10}$, which may be identical or different, each stands for alkyl of 1 to 4 carbon atoms, cyano-ethyl, cyanopropyl, hydroxyethyl, hydroxypropyl, alkanoyl-oxyethyl or -oxy-propyl, each having 2 to 4 carbon atoms in the alkanoyl moiety, benzoyloxyethyl, benzoyloxypropyl or alkoxyalkylene having a total number of 2 to 6 carbon atoms.

The process of the invention is not limited to the preparation of monoazo dyes but also allows dis- and trisazo compounds to be prepared by starting, in the one case, from amines or coupling components already containing an azo group, for example, 5,7-disulfonaphthyl-(2)-2'-azo-3'-amino-6'-sulfo-1'-naphthol or 1-(8'-hydroxy-5'-sulfo-naphthyl-2')-3-methyl-pyrazolone-(5)-7'-azo-benzene, and in the other case, from starting components which are capable of a tetrazotization reaction or a double coupling reaction, for example 2,2'-disulfodiphenylene4,4'-diamine, 1,4-diamino-benzene, resorcinol, p-phthaloyl-bis(4'-sulfo-acetic acid anilide) and 1,8-dihydroxy-naphthalene3,6-disulfonic acid.

The process of the invention also permits the preparation of metal complex compounds, either by starting from monoazo dyes which already contain metals as well as a functional diazo or coupling group to yield metal-containing disazo dyes, or by preparing the metal-free mono- or disazo dyestuff in the manner described above and then converting it into a metal complex compound according to the usual methods (cf. HoubenWeyl, Methoden der organ. Chemie, 4th edition (1965), vol. 10/3, pages 434 et seq.) from the preferably highly concentrated solution or paste obtained according to this invention by adding a metal-yielding agent, either in a very finely divided solid form or in the form of a very concentrated aqueous solution.

The process of the invention can generally also be carried out using starting components which have both diazo and coupling functions, for example 1-(4'-sulfophenyl)-3-methyl-5-aminopyrazole, 2-amino-6-sulfo-8-naphthol or 2-amino-naphthalene-5,8-disulfonic acid. When these compounds are used alone, they act both as diazo and coupling components to yield their azo compounds. Otherwise, they yield mixtures of azo dyes which are, however, searched for in rare cases.

The following Examples illustrate the invention, the parts and percentage being by weight.

EXAMPLE 1:

14.05 Grams (1/20 mol) of 4-aminophenyl-β-hydroxyethylsulfone-sulfuric acid ester and 18.05 g (1/20 mol) of 1-acetylamino-8-naphthol-3,6-disulfonic acid were stirred in 40 ml of water at room temperature, and 3.45 g of sodium nitrate were added. Stirring was continued for about 2 hours, and the product was then dried at 80° C in vacuo. Yield: 100% of the theoretical yield (free of salts).

EXAMPLE 2:

14.05 grams (1/20 mol) of 4-aminophenyl-β-hydroxyethylsulfone-sulfuric acid ester, 11.2 g (1/20 mol) of 1-naphthol-4-sulfonic acid and 3.45 g of sodium nitrite were added to 40 ml of water at room temperature. After stirring had been continued for a short time, the reaction was complete. The dyestuff obtained in this manner was dried in vacuo. Yield: 99% of the theoretical yield (free of salt).

EXAMPLE 3:

In a vessel provided with stirrer, 30 ml of water were introduced at room temperature. After addition of 14.05 g (1/20 mol) of 4-aminophenyl-β-hydroxyethylsulfone-sulfuric acid ester and 11.2 g (1/20 mol) of 1-naphthol-5-sulfonic acid, 3.45 g of sodium nitrite were added while stirring. After the reaction was complete (within about 1 hour), the dyestuff was dried or standardized while moist to meet commercial requirements. Yield of pure dyestuff: 96% of the theoretical yield.

EXAMPLE 4:

100 Grams of dimethylformamide were placed in a vessel provided with a stirrer and, at room temperature, 14.05 g (1/20 mol) of 4-aminophenyl-β-hydroxyethyl-sulfone-sulfuric acid ester and 18.05 (1/20 mol) of 1-acetylamino-8-naphthol-3,6-disulfonic acid were added. Then, 3.45 g of sodium nitrite were added. After stirring had been continued for about half an hour, the temperature was slightly raised to complete the coupling reaction. The mixture was then heated to 80° C, and the solvent was distilled off in vacuo. The remaining dyestuff was pulverized. Yield: 98% of the theoretical yield.

EXAMPLE 5:

100 Grams of technical-grade ethanol (96% strength) were placed in a vessel provided with stirrer, and 14.05 g (1/20 mol) of 4-aminophenyl-β-hydroxyethylsulfone-sulfuric acid ester and 11.2 g (1/20 mol) of 1-naphthol-4-sulfonic acid were added while stirring. At 10° C, 3.45 g of sodium nitrite were added, while allowing the reaction temperature to rise to about 20°–25° C. After stirring had been continued for half an hour, the temperature was slightly raised to complete the coupling reaction, and the solvent was finally distilled off in vacuo at about 50° C. Yield of pure dyestuff: 97% of the theoretical yield.

EXAMPLE 6:

100 Kilograms of acetone were placed in a vessel provided with stirrer, and 14.05 kg of 4-aminophenyl-β-hydroxyethyl-sulfone-sulfuric acid ester and 11.2 kg of 1-naphthol-5-sulfonic acid and finally, at 0° C, 8.65 kg of an aqueous 40% sodium nitrite solution were added while stirring. The temperature was then allowed to come to about 20° C, and the coupling reaction was completed while slightly heating. The solvent was then distilled off in vacuo at 40° C, and the dyestuff thus obtained was pulverized. Yield: 95% of the theoretical yield.

EXAMPLE 7:

32.5 g (0.1 mol) of 1-amino-2-methoxy-5methylbenzene-4-β-hydroxyethylsulfone-sulfuric acid semiester and 25.4 g (0.1 mol) of 1-(4'-sulfophenyl)-3-methyl-pyrazolone-(5) were suspended successively in 100 g of water, at 10° C, and 6.9 g of sodium nitrite were added. The resulting pH of 1 – 2 was adjusted to 3 to 3.5 by adding dropwise dilute aqueous sodium hydroxide solution. This pH-value was maintained during the course of coupling by adding further sodium hydroxide solution, until no more diazo compound could be established. The pH was then adjusted to a final value of 6.0, and the dyestuff solution was spray-dried. Yield of pure dyestuff: 94% of the theoretical yield.

EXAMPLE 8:

At 15° C, 40.0 g (0.1 mol) of 4-amino-3-benzoylaminobenzene-β-hydroxymethylsulfone-sulfuric acid semiester and 28.4 g (0.1 mol) of 1-(4'-sulfophenyl)-pyrazolone-(5)-3-carboxylic acid were stirred in 100 g of water, and 6.9 g of sodium nitrite were added. During the beginning diazotization and coupling reactions, the temperature rose to 20° C. To complete the coupling reaction, sodium hydroxide solution was added until to a pH of about 3.5 which was maintained, while the temperature rose to 25° –30° C. After the coupling reaction was complete, the dyestuff was worked up as in Example 7. Yield: 96% of the theoretical yield.

EXAMPLE 9:

28.1 Grams (0.1 mol) of 4-aminophenyl-β-hydroxyethylsulfone-sulfuric acid semiester and 28.4 g (0.1 mol) of 1-(4'-sulfophenyl)-pyrazolone-(5)-3-carboxylic acid were stirred with 100 g of water of 20° C, and 6.9 g of sodium nitrate were slowly added. To ensure a complete coupling reaction, the pH was adjusted to about 3.5 after 15 minutes as in Example 7, and the dyestuff was worked up as in the same Example. Yield: 98% of the theoretical yield.

EXAMPLE 10:

At 20° C, 70 g of water were placed in a vessel in which 17.05 g (0.05 mol) of 2-amino-5-(β-sulfatoethyl-sulfonyl)-hydroquinone dimethyl ether and 12.7 g (0.05 mol) of 1-(4'-sulfophenyl)-3-methyl-pyrazolone-(5) were then suspended. Diazotization was then performed by adding 3.45 g of sodium nitrite, and the coupling reaction was carried out as in Example 7. A concentrated dyestuff solution was obtained which was cooled to 20° C. In this solution, the same amounts of diazo component, coupling component and sodium nitrite could easily be added as a suspension which could still be stirred and which was once more subjected to diazotization and coupling to yield a highly concentrated, salt-free dyestuff. Yield of pure dyestuff: 96% of the theoretical yield.

EXAMPLE 11:

30.3 Grams (0.1 mol) of 2-aminonaphthalene-1,5-disulfonic acid and 36.2 g (0.1 mol) of 1-(4'-β-sulfato-ethylsulfonylphenyl)-3-methyl-pyrazolone-(5) were stirred in 100 g of water of 15° C, and 6.9 g of sodium nitrite were added. Stirring was continued for 1 hour at 20° – 25° C, and the pH was adjusted to about 3.5 with an aqueous sodium hydroxide solution to ensure complete coupling. The resulting product was worked up as in Example 7. Yield: 95% of the theoretical yield.

EXAMPLE 12:

A mixture of 40.0 g (0.1 mol) of 4'-amino-3-benzoylamino-β-sulfatoethylsulfonyl-benzene and 36.1 g (0.1 mol) of 1-acetylamino8-naphthol-3,6-disulfonic acid were stirred in 120 g of water of 20° C, and 6.9 g of sodium nitrite were added. After stirring had been continued for 1 hour, the coupling reaction was completed at a pH of about 4.0 by adding dropwise dilute sodium hydroxide. The work-up was as in Example 7. Yield: 100% of the theoretical yield.

EXAMPLE 13:

31.1 Grams (0.1 mol) of 4-amino-2(β-sulfatoethyl-sulfonyl)-methoxybenzene and 36.1 g (0.1 mol) of 1-acetylamino-8naphthol-3,6-disulfonic acid were stirred into 90 g of water of 15° C, and diazotization was performed by adding 6.9 g of sodium nitrite. After stirring had been continued for 1 hour, coupling was completed at a pH of about 4.0 by adding sodium carbonate portionwise. The dyestuff was worked up as in Example 7. Yield: 100% of the theoretical yield.

EXAMPLE 14:

In 120 kg of water of 10° C, 28.1 kg (100 mols) of 4-aminophenyl-β-sulfatoethylsulfone and 28.1 kg (100 mols) of 2-acetylamino-8-naphthol-6-sulfonic acid were stirred. To this stirred mixture, a solution of 6.9 kg of sodium nitrite in 20 kg of water was added within 10 minutes. After the reaction mixture had reached a temperature of 20° C, the pH was adjusted to about 4 by slowly adding an aqueous sodium hydroxide solution. After stirring had been continued for 1 hour, the product was worked up as in Example 7. Yield: 96% of the theoretical yield.

EXAMPLE 15:

At 20° C, 6.9 g of sodium nitrite were dissolved in 120 g of water, and to this solution, a mixture of 32.5 g (0.1 mol) of 1-amino-2-methoxy-5-methyl-4(β-sulfatoethylsulfonyl)benzene and 31.8 g of the ammonium salt of 4-acetoacetylamino-5-methoxy-2-methylbenzenesulfonic acid were slowly added. About 10 minutes after this addition, coupling was complete. The dyestuff was isolated by spray-drying. Yield: 100% of the theoretical yield.

EXAMPLE 16:

At room temperature, 22.15 g (9.1 mol) of 2-chloro-5-aminotoluene-4-sulfonic acid and 25.4 g (0.1 mol) of 3-methyl-1-(4'-sulfophenyl)-pyrazolone-(5) were stirred into 70 g of water. 6.9 Grams (0.1 mol) of sodium nitrite were then added. After about 10 minutes, the reaction was almost complete, and the reaction temperature had risen to about 40° C. To prepare the neutral sodium salt, 4 g of sodium hydroxide dissolved in 10 g of water were added, whereupon the coupling reaction was complete. The paste obtained was dried in vacuo at 80° C. Yield: 99% of the theoretical yield. The ground dyestuff dyes wool yellow shades.

EXAMPLE 17:

At room temperature, 15.95 g (1/20 mol) of 1-amino-8-naphthol-3,6-disulfonic acid and 15.65 g (1/20 mol) of 1-(4'-tolylamino)-naphthalene-8-sulfonic acid were added to 150 g of water. After stirring had been continued for 1 hour while the temperature rose to about 35° C, the reaction was complete; the suspension was dried in vacuo at 80° C. Yield of salt-free pure dyestuff: 98% of the theoretical yield. The dyestuff dyes wool blue shades.

EXAMPLE 18:

At room temperature, 22.15 g (1/10 mol) of 1-amino-3-chloro-2-methylbenzene-5-sulfonic acid, 22.4 g (1/10 mol) of 1-naphthol-4-sulfonic acid and 6.9 g of sodium nitrite were successively stirred into 100 g of water. Stirring was continued for 1 hour to complete the coupling reaction. The solution was rendered neutral by means of a solution of 4 g of sodium hydroxide in 10 g of water. The product was then dried in vacuo at 80° C, the dyestuff thus obtained (yield 100%) dyes wool orange red shades.

EXAMPLES 19:

At room temperature, 19.85 g (1/10 mol) of 5-chloro-4-amino-2-acetamino-toluene, 25.4 g (1/10 mol) of 3-methyl-1-(4'-sulfophenyl)-pyrazolone-(5) and 6.9 g of sodium nitrite were successively stirred into 100 g of water. Stirring was continued for half an hour, and the temperature was then raised to 40° C, whereupon coupling of the dyestuff was complete. At the end of the reaction, the suspension gave an almost neurtal reaction; it was dried at 70° C in vacuo. The dyestuff obtained in this manner with a yield of 98%, dyes wool and silk yellow shades.

EXAMPLE 20:

At room temperature, 8.65 g (1/20 mol) of sulfanilic acid and 12.8 g (1/20 mol) of 3-methyl-1-(4'-sulfophenyl)-pyrazolene-(5) were stirred in 50 g of dimethylformamide, whereupon 3,45 g of sodium nitrite were added. After 5 minutes, 1.6 g of solid pulverulent sodium hydroxide were added while stirring; the reaction mixture was then slightly heated to 40° C for 15 minutes, and then the solvent was removed in vacuo at 80° C. Yield: 97% of the theoretical yield.

EXAMPLE 21:

In a vessel provided with stirrer, 50 kg of technical-grade ethanol (of 96% strength), 8.65 kg of sulfanilic acid and 7.2 kg of β-naphthol were mixed at room temperature; 3.45 kg of sodium nitrite were slowly added by means of a screw. Stirring was continued for 15 minutes, and the temperature was slightly raised to complete coupling. Then the solvent was removed in vacuo at 50° C. The dried dyestuff was ground. Yield: 100 % of the theoretical yield.

EXAMPLE 22:

At room temperature, 17.2 g (1/20 mol) of 4,4'-diaminodiphenyl-2,2'-disulfonic acid and 14.4 g (2/20 mol) of β-naphthol were mixed while stirring, and 17.3 g of a 40% aqueous solution of sodium nitrite were added. After 15 minutes, the temperature was slightly raised to 40° C for 10 minutes, the solvent was then removed in vacuo at 40° C. Yield: 98% of the theoretical yield.

EXAMPLE 23:

A stirrer-provided vessel contained 200 g of water of 10° C, into which 28.1 g of 4-aminophenyl-β-sulfatoethylsulfone and 42.3 g of 1-benzoylamino-8-naphthol-4,6-disulfonic acid were introduced; with stirring, 100 parts by volume of a 1N sodium nitrite solution were slowly added dropwise. The resulting dyestuff solution had then a pH of 3 to 4, and its dyestuff content corresponded to a 100% yield.

The solution can be used as such for the preparation of dyebaths or printing pastes or it may be converted into powder form in the usual manner, for example by spray-drying. Yield: 100% of the theoretical yield. The dyestuff dyes cotton brilliant yellowish red shades.

EXAMPLE 24:

28.1 Parts of 4-aminophenyl-β-phosphatoethylsulfone and 28.1 parts of 2-acetylamino-8-naphthol-6-sulfonic acid were stirred in 150 parts of water of 10° C, and 6.9 parts of sodium nitrite were added portionwise whereupon the pH rose from 3.2 to 4.0 and the temperature to 22° C. After the last portion of sodium nitrite had been added, coupling was complete. After evaporation, the dyestuff was obtained with a 98% yield (at 60° C in vacuo); it dyes cotton orange-red shades.

EXAMPLE 25:

29.7 Parts of 2-aminophenyl-4-β-sulfato-ethyl-sulfone and 36.1 parts of 1-acetylamino-8-naphthol-3,6-disulfonic acid were stirred in 200 parts of water of 15° C, and 6.9 parts of sodium nitrite was added to effect diazotization. The pH of 5 hardly changed during the coupling reacton lasting for several hours. After no more diazonium compound had been established, 18.2 parts of copper acetate were added at room temperature. Complex formation took place immediately, while the temperature rose by about 6° C. The dyestuff paste was spray-dried. The yield amounted to 99% of the theoretical yield. The dyestuff dyes cotton a red violet shade.

EXAMPLE 26:

32.5 Parts of 1-amino-2-methoxy-5-methylbenzene-4-β-sulfatoethylsulfone and 31.8 parts of ammonium 1-acetoacetylamino-2-methoxy-5-methylbenzene-4-sulfonate were successively introduced into 140 parts of water of 5° C. After addition of 6.9 parts of sodium nitrite, the dyestuff formed at once in a quantitative yield, while the pH rose to 5.5. After evaporation in vacuo, a yellow powder was obtained which dyes cotton greenish yellow shades. Yield: 100% of the theoretical yield.

EXAMPLE 27:

25.5 Parts of 2-chloro-aniline and 50.8 parts of 1-(4'-sulfophenyl)-3-methyl-pyrazolone-(5) were finely divided with 500 parts of water at room temperature using a dissolver, while slowly adding 50 parts of an aqueous solution of 13.8 parts of sodium nitrite. While the temperature rose to about 35° C, the dyestuff formed within 10 minutes. After the water had been evaporated, 82.5 parts of a dyestuff powder were obtained which dyes wool greenish yellow shades.

EXAMPLE 28:

17.3 Parts of aniline-4-sulfonic acid and 29.3 parts of N-(2'-hydroxy-3'-naphthoylamino)-2-methoxy-benzene were stirred with 500 parts of water at 35° C in a dispenser, and then 6.9 parts of sodium nitrite were added. While stirring was continued, the temperature was raised to 60° C, whereupon there was no longer reaction establishing diazonium compound. After cooling, the jelly-like dyestuff mass was concentrated to dryness in vacuo. Yield: 49.8 parts of a red dyestuff powder. The dyestuff dyes wool yellowish red shades.

EXAMPLE 29:

27.4 Parts of 4,4'-diamino-triphenylmethane were dissolved in 50 parts of dimethylformamide, this solution was added dropwise, while stirring rapidly, to 500 parts of water. To the resulting dispersion 60.5 parts of 1-(6'-chloro-2'-methyl-4'-sulfophenyl)-3-methyl-pyrazolone-(5) were added, and while dispersing was continued, an aqueous solution of 13.8 parts of sodium nitrite was added dropwise within half an hour. At the end of the reaction, the temperature was 35° – 40° C, and a limpid yellow solution was obtained. After the solvent had been evaporated in a rotary evaporator, 94 parts of a dyestuff were obtained which dyes wool pure greenish yellow shades.

EXAMPLE 30:

22.3 Parts of 2-naphthylamino-1-sulfonic acid and 32.3 parts of 1-(2', 5'-dichloro-4'-sulfophenyl)-3-methylpyrazolone-(5) were introduced while stirring into 250 parts of water, and 6.9 parts of sodium nitrite were added. During 1 hour, 5 parts of anhydrous sodium carbonate were added, whereupon coupling was complete. The resulting solution was concentrated to dryness in vacuo to yield 60 parts of a dyestuff powder which dyes wool greenish yellow shades.

EXAMPLE 31:

17.3 Parts of aniline-2-sulfonic acid and 36.1 parts of 1-acetylamino-8-naphthol-3,6-disulfonic acid were introduced into 300 parts of water of 20° C, and an aqueous solution of 6.9 parts of sodium nitrite was added. After stirring had been continued for 30 minutes, coupling was completed by buffering the solution through dropwise addition of an aqueous solution of 27 parts of crystallized sodium acetate to reach a pH of about 4.5 to 5. After evaporation of the dyestuff solution, 61 parts of a red dyestuff powder were obtained, which dyes silk, cotton and spun rayon red shades.

EXAMPLE 32:

At 20° C, parts of 2:aminotoluene-4,5-disulfonic acid were introduced while stirring into 250 parts of water; 30.4 parts of 2-naphthol-3,6-disulfonic acid and 6.9 parts of sodium nitrite were then added, and stirring was continued for 15 minutes. The slow onset of coupling was promoted by adding portionwise 53.5 parts of crystallized disodium hydrogenophosphate, and coupling was completed at a pH of about 5. The dyestuff was obtained with a yield of 95% and dyes silk and spun rayon orange shades and polyamide fibers in the same shades from a strongly acid dyeing bath.

EXAMPLE 33:

At 15° C, 25.4 parts of 1-(4'-sulfophenyl)-3-methyl-pyrazolone-(5), 30.3 parts of 2-napthylamino-1,5-disulfonic acid and 6.9 parts of sodium nitrite were successively introduced into 300 parts of water and stirred for 30 minutes. The strongly acid coupling mixture was buffered by adding 8.5 parts of sodium metaborate, and coupling was completed. The dyestuff yield was 96%. The dyestuff obtained dyes cotton, spun rayon and silk medium-yellow shades.

EXAMPLE 34:

At 20° C, 13.8 parts of 4-nitro-aniline, 25.4 parts of 3-methyl-1-(4'-sulfophenyl)-pyrazolone-(5) and 6.9 parts of dried and ground sodium nitrite were introduced into 200 parts of gasoline boiling between 110° and 140° C. 8 Parts of N-methylpyrrolidone were then added, and the mixture was stirred for 5 hours at room temperature, whereupon a yellow-colored, crumbly precipitate of the dyestuff was obtained. Suction-filtration, washing with 50 parts of gasoline and drying in vacuo resulted in 39.2 parts of a yellow dyestuff which dyes wool, spun rayon and silk deep yellow shades.

EXAMPLE 35:

At 20° C, 13.8 parts of 4-nitroaniline and 25.4 parts of 3-methyl-1-(4'-sulfophenyl)-pyrazolone-(5) were introduced while stirring into 200 parts of gasoline distilling at 80°–110° C, and over 15 minutes, 11.7 parts of amyl nitrite were added dropwise. While the temperature rose to 30°–32° C, a yellow dyestuff began to form with increasing viscosity. After another 30 minutes, the temperature fell again. To complete the dyestuff formation, another 5 parts of pyridine were added dropwise, whereupon the temperature rose again by 2° to 3° C. Stirring was then continued for 1 hour, the product was suction-filtered, washed with 50 parts of gasoline and dried in vacuo. 40 Parts of a yellow dyestuff were obtained which dyes wool, spun rayon and silk deep yellow shades. It is identical with the dyestuff of Example 34.

EXAMPLE 36:

With stirring, 13.8 parts of 4-nitroaniline and 18.8 parts of 2-hydroxynaphthaline-3-carboxylic acid were introduced into 200 parts of gasoline distilling at 110°–140° C, and within 10 to 20 minutes, 11.7 parts of amyl nitrite were added dropwise, whereupon the temperature rose from 22° C to 33° C and was maintained for about 1 hour. Stirring was continued for 2 hours while the temperature dropped again, and the grainy, brown-red powder was suction-filtered. After washing with 50 parts of gasoline, the product was dried in vacuo to yield 33.4 parts of a red dyestuff which dyes polyester fiber material, after padding and thermosoling, a bright red shade.

EXAMPLE 37:

At 20° C, 13.8 parts of 4-nitoaniline and 30.25 parts of 3-methyl-1-(6′-chloro-2′-methyl-4′-sulfophenyl)-pyrazolone-(5) were suspended while stirring in 150 parts of gasoline distilling at 80° – 110° C, and within 20 minutes, 11.7 parts of amyl nitrite were added dropwise, while the temperature rose slowly to 30° C. The dyestuff precipitated as a greenish yellow powder. After the temperature had been raised to 40° C, 5 parts of pyridine were slowly added to complete the reaction. After one hour, the product was suction-filtered, washed with 50 parts of gasoline and dried in vacuo to yield 44 parts of a greenish yellow dyestuff powder which produced bright greenish yellow dyeings on wool, silk and spun rayon.

The following Table shows further dyestuffs to be prepared according to the process of the invention:

TABLE

| | Diazo component | Coupling component | Shade |
|---|---|---|---|
| 1) | 2-aminofluorenesulfonic acid | 1-(4′-sulfophenyl-)-pyrazolone-(5)-3-carboxylic acid | yellow |
| 2) | 4-aminodiphenylether-2-sulfonic acid (2 mols) | 2,5-dimethyl-1,4-bis-(N-aceto-acetyl-amino)-benzene | yellow |
| 3) | aniline-4-sulfonic acid | 1-(3′-carbamidophenyl)-3-methyl-pyrazolone-(5) | yellow |
| 4) | 2-naphthylamine-1-sulfonic acid | 4-bromophenol | red-brown |
| 5) | 2-naphthylamino-1,5-disulfonic acid | 5-acetoacetylamino-benzoxazolone | olive yellow |
| 6) | 2-aminodiphenylether-4-sulfonic acid | N-(2′-hydroxy-3′-naphtoyl)-aniline | scarlet |
| 7) | aniline-2-sulfonic acid (2 mols) | bis-(N-acetoacetyl)-p-phenylene diamine | yellow |
| 8) | 4,4′-diaminodiphenyl methane-3,3′-dicarboxylic acid | 1-naphthol-4-sulfonic acid (2 mols) | brown red |
| 9) | aniline-4-sulfonic acid | 2-cresol | yellow brown |
| 10) | aniline-4-sulfonic acid (2 mols) | N,N-bis-(terephthaloyl-acetyl)-analine-p-sulfonic acid | dark yellow |
| 11) | 4-aminotoluene-3-sulfonic acid | N-acetoacetyl-2-amino-1,4-di-ethoxy-benzene | reddish yellow |
| 12) | 2-chloro-5-aminotoluene-4-sulfonic acid | N-acetoacetyl-6-nitro-3-amino-4-methoxytoluene | yellow |
| 13) | 2-naphthylamine-1-sulfonic acid | benzoyl acetic acid anilide-p-sulfonic acid | brownish yellow |
| 14) | 4,4′-diaminodiphenyl ether-2,2′-disulfonic acid | 5-chloro-2-hydroxybenzoic acid (2 mols) | red brown |
| 15) | 5-carboxy-4-chloroaniline-2-sulfonic acid | 3-methyl-(2′-naphthyl)-pyrazolone-(5)-4,8-disulfonic acid | yellow |
| 16) | 1-amino-4-acetaminobenzene-ω-sulfonic acid | 1,3-diphenylpyrazolone-(5) | yellow |
| 17) | 5-nitro-2-aminoanisol-4-sulfonic acid | 1-(3′-nitrophenyl)-pyrazolone-(5)-3-carboxylic acid | yellow |
| 18) | 2-nitraniline-4-sulfonic acid | 2-hydroxy-3-naphthoic acid | red |
| 19) | 6-chloro-4-amino-3-hydroxytoluene | 1-6′ -chloro-2′-methyl-4′-sulfophenyl)-3-methyl-pyrazolone-(5) | yellow |
| 20) | 2-(4′-amino-3-sulfophenyl)-6-methyl-benzthiazole-4-sulfonic acid | 2-naphthol | red |
| 21) | 5-carboxy-4-chloroaniline-2-sulfonic acid | 2-n-propylphenol | brown |
| 22) | 2-chloro-5-aminotoluene-4-sulfonic acid | 3-cresol | red brown |
| 23) | aniline-2-sulfonic acid | 2-chlorophenol | yellow |
| 24) | 2-aminodiphenylene oxide-7-sulfonic acid | 2-naphthol | dark brown |
| 25) | 2-aminodiphenylene oxide-7-sulfonic acid | 1-(4′-sulfophenyl)-3-methyl-pyrazolone-(5) | brown yellow |
| 26) | aniline-2-sulfonic acid | 2-hydroxycarbazole-3-carboxylic acid | brown violet |
| 27) | 2-naphthylamine-1,5-disulfonic acid | 2-hydroxycarbazole-3-carboxylic acid | black violet |
| 28) | 2-naphthylamine-1-sulfonic acid | 3-hydroxydiphenylene oxide-2-carboxylic acid | violet brown |
| 29) | aniline-4-sulfonic acid | 3-hydroxydiphenylene oxide-2-carboxylic acid | brown |
| 30) | 7-aminobenztriazole | 3-N-acetoacetylamino-4-methoxy-toluene-6-sulfonic acid | yellow |
| 31) | 7-aminobenztriazole | 1-(4′-sulfophenyl)-3-methyl-pyrazolone-(5) | yellow |
| 32) | 7-amino-2-hydroxy-4-methylquinoline-6-sulfonic acid | 2-naphthol | brown red |

TABLE-continued

| | Diazo component | Coupling component | Shade |
|---|---|---|---|
| 33) | 7-amino-2-hydroxy-4-methylquinoline-6-sulfonic acid | N-acetoacetylaminobenzene | dark yellow |
| 34) | 2-aminobenzthiazole-6-sulfonic acid | 1-(4'-sulfophenyl)-13-methyl-pyrazolone (5) | yellow |
| 35) | 4-aminodiphenyl-3-carboxylic acid | 1-(4'-sulfophenyl)-3-methyl-pyrazolone (5) | yellow |
| 36) | 4-aminodiphenyl ether-2-sulfonic acid | 2-naphthol | red |
| 37) | 2-aminodiphenyl ether-4-sulfonic acid | N-(2'-hydroxy-3-'-naphthoylamino-) 4-methoxybenzene | ruby-red |
| 38) | 3-aminodiphenylmethane-2-carboxylic acid | 1-(2',5'-dichloro-4'-sulfo-phenyl)-3-methylpyrazolone(5) | yellow |
| 39) | 4-nitro-4'-aminostilbene-2,2'-disulfonic acid | 2-acetamino-8-naphthol-6-sulfonic acid | violet |
| 40) | 4-aminodiphenylamine-2-sulfonic acid | 1-acetamino-8-naphthol-3,6-disulfonic acid | violet |
| 41) | 4,4'-diaminodiphenyl ether-2,2'-disulfonic acid | 5-acetoacetylamino-7-chloro-benzimidazolone (2 mols) | yellow |
| 42) | 4,4'-diaminodiphenylmethane-3,3'-dicarboxylic acid | 1-(4'-sulfophenyl)-3-methyl-pyrazolone-(5) (2 mols) | yellow |
| 43) | 4,4'-diaminodiphenylsulfone-3,3'-dicarboxylic acid | 2-naphthol (2 mols) | scarlet |
| 44) | 2-amino-2',3-dimethylazobenzene-4',5-disulfonic acid | 2-acetamino-8-naphthol-6-sulfonic acid | brown violet |
| 45) | 2-(3''-aminobenzoyl-3'-aminobenzoyl)-amino-5-naphthol-7-sulfonic acid | 1-(2'-chloro-4'-sulfophenyl)-3-methyl-pyrazolone-(5) | yellow brown |
| 46) | 2-(m-aminophenyl)-5-hydroxynaphth-(2',1',4,5)-thiazole-7'-sulfonic acid | 1-(2',5'-dichloro-4'-sulfo-phenyl)-3-methylpyrazolone-(5) | olive brown |
| 47) | 2-(4'-aminobenzoyl)-amino-8-naphthol-6-sulfonic acid | 1-(4'-sulfophenyl)-pyrazolone-(5)-3-carboxylic acid | brown |
| 48) | 2-aminobenzonitrile | 1-4'-sulfophenyl)-3-methyl-pyrazolone-(5) | |
| 49) | 2-aminodiphenyl ether-4-sulfonic acid (2 mols) | 2,5-N,N-bis-(acetoacetylamino)-benzotrifluoride | yellow |
| 50) | 2,5-diaminobenzotrifluoride | 1-(6'-chloro-2'-methyl-4'-sulfo-phenyl)-3-methyl-pyrazolone (5) | yellow brown |
| 51) | 1-amino-8-naphthol-3,6-disulfonic acid | 3-diethylaminotoluene | brown violet. |
| 52) | 2-chloro-4-aminotoluene-5-sulfonic acid | 3-diethylaminoanisole | red brown |
| 53) | 2-nitraniline-4-sulfonic acid | 3-chloro-N,N-dihydroxy ethyl-aniline | olive brown |
| 54) | 4,4'-diaminodiphenylsulfide-2,2'-disulfonic acid | 2-β-cyano ethylamino-4-acet-amino-anisole (2 mols) | red brown |

We claim:

1. In a process for the preparation of a water-soluble azo dyestuff wherein an aromatic amine is diazotized with a stoichiometric amount of an alkali metal nitrite and reacted with a stoichiometric amount of a coupling component in water or in an organic solvent which does not contain an acid or basic group, or in a mixture of such organic solvent and water, at least one of said amine or said coupling component containing a free acid group, the improvement consisting fo reacting said aromatic amine and said coupling component with said nitrite in the absence of an acid.

2. A process as recited in claim 1, wherein the pH is adjusted to a value favorable for coupling, using an acid-binding inorganic compound or buffer substance, introduced at the same time as or subsequent to the addition of the nitrite.

3. A. process according to claim 1 which is performed in the presence of an inorganic compound having an alkaline reaction, or an acid-binding buffer compound.

4. A process according to claim 1, wherein the organic solvent is miscible with or soluble in water.

* * * * *